A. T. CAVEY.
BITUMINOUS ROOFING.
APPLICATION FILED JUNE 18, 1919.
1,361,517.
Patented Dec. 7, 1920.
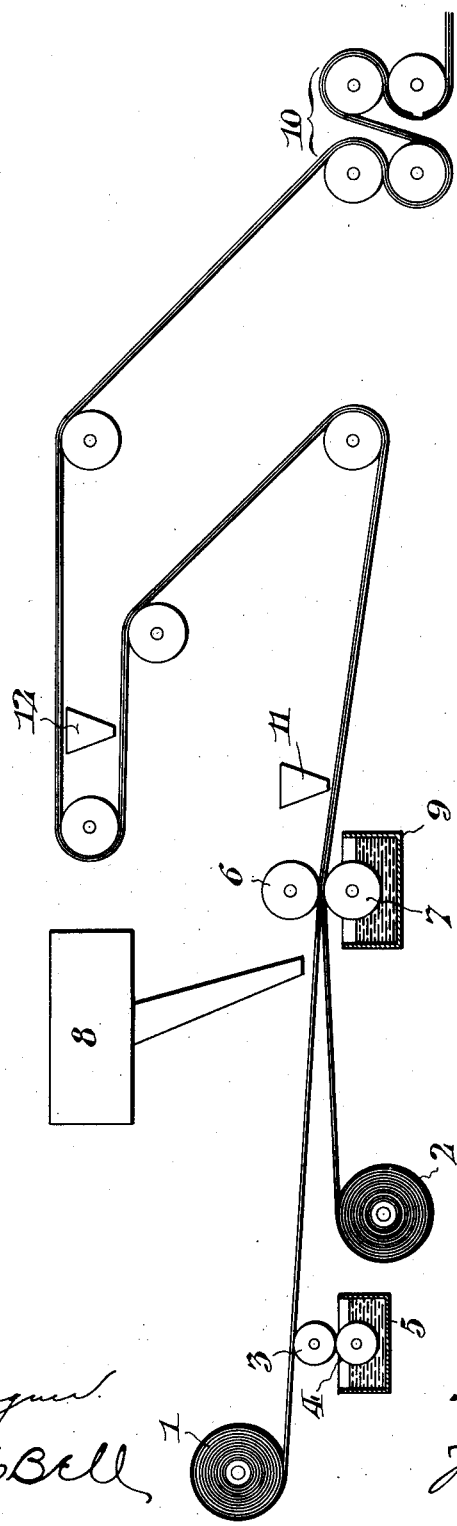
WITNESSES:
John E. Bergner
James H. Bell
INVENTOR:
Arthur T. Cavey,
BY
ATTORNEYS.

UNITED STATES PATENT OFFICE.

ARTHUR T. CAVEY, OF PHILADELPHIA, PENNSYLVANIA, ASSIGNOR TO THE BARBER ASPHALT PAVING COMPANY, OF PHILADELPHIA, PENNSYLVANIA, A CORPORATION OF WEST VIRGINIA.

BITUMINOUS ROOFING.

1,361,517.  Specification of Letters Patent.  Patented Dec. 7, 1920.

Application filed June 18, 1919. Serial No. 305,126.

*To all whom it may concern:*

Be it known that I, ARTHUR T. CAVEY, a citizen of the United States, residing in the city and county of Philadelphia and State of Pennsylvania, have invented certain new and useful Improvements in Bituminous Roofings, whereof the following is a specification, reference being had to the accompanying drawing.

My invention relates to means whereby bituminous roofing, when laid with overlaps, may be caused to adhere along the overlaps. It is particularly applicable to bituminous shingles which, when laid in overlapping relation to each other on a roof, have a tendency to be displaced by warping, twisting or wind pressure. To overcome this, I apply to the underside of the bituminous roofing a cement coating in the form of a comparatively soft, non-drying, water-proof cement.

According to my invention, this cementing material is applied to one side of the bituminous roofing as part of the process of manufacture, the roofing material being produced in duplicate superposed plies or layers with the cement bearing surfaces in juxtaposition. In this condition, the roofing is transportable. Before laying, the duplicate layers of roofing are stripped apart and then laid in such manner that the sticky adhesive cement will unite the overlaps.

The accompanying drawing is a diagrammatic representation of the method of manufacturing bituminous roofing according to my invention.

1 and 2, are rolls of saturated felt. As the roll 1, is unwound, the lower surface of the felt comes in contact with a roll 3, by which an even layer of the adhesive cement is applied. Said roll is supplied with the adhesive cement by a companion roll 4, running in a supply trough 5. Thereafter the two layers of saturated felt run together and are temporarily cemented together by the adhesive cement. As they pass between the rolls 6 and 7, a non-sticky bituminous material having relatively high melting point is applied to the outside surfaces of the duplex felt layers, said material serving as a weather resisting coating. The material for the upper surface is supplied from a hopper 8, and is distributed by the roll 6. The material for the lower surface is directly applied by the roll 7, which runs partly immersed in the supply trough 9. The duplex roofing is subsequently passed about a series of cooling rolls 10, and thereby placed into proper condition for packing.

During the process of manufacture, the roofing may be coated with a granulated mineral covering, such covering being supplied along the course of the travel of the roofing by distributing hoppers indicated conventionally at 11 and 12, in the drawings. If a plain finish is desired, the hot asphaltum exterior surface coating is dusted with powdered talc or other suitable substance such as commonly employed in the manufacture of prepared roofing. The duplicated layers of bituminous roofing thus produced, are properly coated with weather resisting bituminous coating on the upper surface and with adhesive cement on the lower surface, which is in juxtaposition to the corresponding surface of another layer. In this condition, the duplicated layers are cut into suitable shapes, such as shingles, etc.

It is necessary to make adhesive cement which has special characteristics, so that it will retain its adhesive nature for a long time, and also to render possible the stripping apart of the roofing preparatory to laying. I find that a suitable adhesive waterproof cement for the purpose of my invention may be made by combining ninety per cent. (90%) of castor oil with ten per cent. (10%) of gilsonite, but it will be understood that any similar lubricating or paint oil may be employed, and also that other asphaltum may be used, or such substances as coal tar, resin, stearin pitch, petroleum asphalts, etc. The portions of asphaltum to the oil will necessarily vary according to the materials employed, and their original consistencies, but it is desirable that the proportions should be such that a temperature of 212° F. will produce a mixture having the same consistency as castor oil at 60° F. This affords a soft, non-drying, water-proof cement, which does not become too stiff in cold weather to readily strip apart without flaking, and which retains its adhesive properties for a long time and with sufficient tenacity to resist wind pressure and all ordinary warping or twisting of bituminous roofing after laying.

In the application of the adhesive waterproof cement to the bituminous roofing, it is necessary to avoid any excess, as such excess might escape in the package when the material is rolled or bundled for shipping purposes with resulting damage to the product. Therefore, only so much cement is applied as the felt is capable of retaining in place by surface tension or absorption.

Having thus described my invention, I claim:

1. Bituminous roofing material comprising duplicate sheets each coated on one side with a weather resisting coating and on the other with an adhesive water-proof cement, said sheets being superposed and adherent with the cementing surfaces in juxtaposition, and capable of being subsequently stripped apart and laid with the cement securing overlapping portions of the roofing.

2. As an article of commerce, roofing material coated with a weather resisting coating and comprising superposed plies held together by an interposed layer of adhesive water-proof bituminous cement, and capable of being stripped apart to form separate sheets each with a coating of said adhesive cement for securing it when laid.

In witness whereof, I have hereunto signed my name at Philadelphia, Pennsylvania, this sixteenth day of June 1919.

ARTHUR T. CAVEY.

Witnesses:
 JAMES H. BELL,
 E. L. FULLERTON.